Patented Mar. 27, 1945

2,372,598

UNITED STATES PATENT OFFICE 2,372,598

ETHYLENE SULPHIDE REACTION PRODUCTS OF GUANIDINE

Leonard P. Moore, New York, N. Y., and Walter P. Ericks, Stamford, Conn., assignors to American Cyanamid Company, New York, N. Y., a corporation of Maine No Drawing. Application September 19, 1942, Serial No. 459,000

1 Claim. (Cl. 260—564)

This invention relates to the preparation of new guanidine derivatives. More particularly it embraces the reaction of ethylene sulphide with guanidine. It relates especially to the preparation of mercapto-alkyl guanidines. This case is a continuation-in-part of Serial No. 370,146, filed December 14, 1940, by Leonard P. Moore and Walter P. Ericks now Patent 2,323,409.

It is an object of this invention to prepare these compounds by simple and efficient processes. A further object is to obtain them in a conveniently utilizable form. Other and further objects as well as uses for the compounds herein prepared will be found in the following description.

The objects of this invention are attained by reacting ethylene sulphide with guanidine. These reactions may be effected with or without external heating or cooling.

The new preparations find a very wide range of uses. For example, they can be applied to leather as dehairing agents. They are useful also as intermediates in the preparation of resins, some forming resinous polymerization products by simply heating the product. Still others are highly effective and cheap insecticides. Still other uses are found in the compounding of rubber and rubber containing articles where the products of this invention are found to exert favorable plasticizing and some vulcanization accelerating activity.

In order to facilitate a further understanding of the invention, the following examples are given primarily for the purpose of illustrating certain more specific details thereof. The scope of the invention is not to be deemed limited thereby except as defined in the claim.

Example 9 g. of guanidine carbonate (0.05 mol.) were dissolved in 100 cc. of denatured ethyl alcohol containing 5.8 cc. of sulphuric acid (0.1 mol.). 8.4 g. of sodium hydroxide (0.2 mol.) dissolved in 25 cc. of water was added and the precipitate of sodium sulphate formed was separated by filtration. The filtrate was evaporated to 20 cc. on a steam bath under vacuum. 6 g. of ethylene sulphide was added to this aqueous solution, the reaction mixture refluxed for 3 hours and dried at 90° C. to yield 11.4 g. of the desired product 2-mercaptoethyl guanidine.

It is to be understood that the scope of this invention is not to be limited by the examples specifically contained herein illustrating specific embodiments of the invention since many modifications and various combining weights of the reacting ingredients may be used, but that it is to be construed broadly and restricted solely by the scope of the appended claim.

We claim:

A method of preparing ethylene sulphide-guanidine complexes which comprises reacting molecularly equivalent proportions of guanidine carbonate and ethylene sulphide by effecting the reaction of the guanidine carbonate in an equeous alcoholic menstruum, acidified with sulphuric acid, the latter being neutralized with a substantially equivalent reacting proportion of sodium hydroxide to form a precipitate of sodium sulphate, filtering out the precipitate and reacting the filtrate with the reacting proportion of ethylene sulphide, and refluxing.

LEONARD P. MOORE.
WALTER P. ERICKS.